United States Patent
Osder

[11] 3,752,420
[45] Aug. 14, 1973

[54] AUGMENTED WASHOUT CIRCUIT FOR USE IN AUTOMATIC PILOTS

[75] Inventor: Stephen S. Osder, Scottsdale, Ariz.

[73] Assignee: Sperry Rand Corporation, New York, N.Y.

[22] Filed: Jan. 4, 1971

[21] Appl. No.: 103,554

[52] U.S. Cl.......... 244/77 D, 235/150.25, 244/3.21, 244/77 M, 244/77 V, 318/584
[51] Int. Cl. .............................................. B64c 13/18
[58] Field of Search.................. 235/150.27, 150.26, 235/150.25; 318/580, 584; 244/77 V, 3.21, 3.22, 77 D, 77 A, 77 F

[56] References Cited
UNITED STATES PATENTS
3,296,422 1/1967 Rusler............................ 235/150.25
3,240,447 3/1966 Olshausen....................... 244/77 D
2,733,878 2/1956 Ciscel............................. 244/77 V
3,533,060 10/1970 Aker.......................... 235/150.27 X Primary Examiner—Trygve M. Blix
Assistant Examiner—Stephen G. Kunin
Attorney—S. C. Yeaton

[57] ABSTRACT

The invention is used in automatic pilots for navigable craft and comprises a washout circuit responsive to the signals from a body mounted pitch rate sensor and to the pitch rate signals from a vertically referenced sensor. The washout circuit comprises an algebraic summation circuit with an integrator in shunt therewith. The signals from the body mounted sensor are applied to an input of the summation circuit and the signals from the vertically referenced sensor are applied to an input to the integrator in subtractive fashion. Thus, the washout circuit provides wide bandwidth pitch rate stabilizing signals while washing out the undesirable azimuth rate coupling component of the feedback signal from the body mounted pitch rate sensor.

14 Claims, 2 Drawing Figures

AUGMENTED WASHOUT CIRCUIT FOR USE IN AUTOMATIC PILOTS

BACKGROUND OF THE INVENTION

1. Field of the Invention

The present invention pertains to automatic pilots for navigable craft particularly with regard to longitudinal control of aircraft wherein the automatic pilot has a pitch command input from the control column.

2. Description of the Prior Art

Prior art automatic pilots are known that utilize a body-mounted rate gyro to provide the aerodynamic and elastic mode feedback signals for the system. As is known, when a craft utilizing such a system executes banked turns, a steady state azimuth rate component is coupled into the pitch channel, hence causing an erroneous nose-down command. In fighter type aircraft, this nose-down command is compensated by the human pilot by applying back pressure on the stick. This is not considered objectionable in fighter aircraft where the pilot is constantly maneuvering with light stick forces. In modern jet transports, however, where the cruise flight regime is ordinarily controlled automatically, it would be objectionable to require the flight officers to manually perform the compensation for the erroneous nose-down command when executing banked turns.

Prior art automatic pilots used in jet transports have eliminated the azimuth rate coupling term by means of a conventional washout in the automatic pilot control law. This solution, while satisfactory for small jet transports, fails to provide an adequate solution to the problem for larger modern jet aircraft, particularly of the mammoth supersonic type. Since the aerodynamic rigid-body modes such as the phugoid and short-period modes are of a relatively low frequency, the washout circuit, as well as removing the undesirable nose-down command signal, also removes a significant portion of the desirable feedback signals; hence tending to destabilize the automatic pilot. If the time constant of the washout circuit is made sufficiently long that the desirable low frequency feedback signals remain effective, the circuit will not wash out the azimuth rate coupling term fast enough to prevent the nose-down command.

Another prior art solution to this problem has been to derive the local vertical pitch rate feedback signal from a vertically referenced inertial platform. Although the inertial platform is not subject to azimuth coupling in banked turns as is a body mounted sensor, a platform may not ordinarily be strategically located at a station on the fuselage so as to properly sense the body-bending motions. Such a system, therefore, does not have adequate elastic mode stability. Additionally, an inertial platform is one of the more complex and thus unreliable components of an automatic flight control system and it is therefore undesirable to rely solely on platform signals for stabilizing the aircraft, particularly if the stability loops are essential for achieving acceptable vehicle handling qualities.

The limitations mentioned above with regard to the inertial platform are also pertinent to the utilization of a vertical gyro. Deriving pitch rate from either an inertial platform or a vertical gyro using rate networks is a problem in prior systems because of undesirable noise effects associated with power supply modulations and the like.

SUMMARY OF THE INVENTION

The present invention overcomes the limitations of the prior art systems by providing a washout network comprising an algebraic summation circuit with an integrator in shunt therewith. The body mounted rate sensor signals are applied to an input of the summation circuit and the derived rate signals from a vertically referenced pitch attitude sensor, for example a vertical gyro or stable platform, are applied to an input of the integrator in subtractive fashion. The result of this summation is a washout circuit which provides wide bandwidth pitch rate stabilizing signals obtained from a properly located body axis sensor while washing out the undesirable azimuth rate coupling component of the body mounted pitch rate sensor signals. The summation circuit restored the pitch rate low frequency components that are washed out by the washout effect but the restored signals do not contain the adverse azimuth rate coupling signals. The restored components are obtained from the vertically referenced sensor but the summation circuit inherently removes the undesirable noise components often found in derived rate signals. Additionally, in the event of failure of the vertically referenced sensor, the washout circuit of the present invention still produces signals providing adequate rigid body stabilization.

DESCRIPTION OF THE PREFERRED EMBODIMENT

Although the present invention has applicability in numerous types of automatic pilot systems, it will be explained in terms of a rate command augmentation system of a type currently in use in the art. A command augmentation automatic pilot is defined in the art as a system in which the manual command input is combined with the aerodynamic feedback signals to provide the inner loop error signal to the control law circuits. Such systems are currently utilized in aircraft for advantages recognized by those skilled in the art. The invention will be described particularly with regard to the pitch axis of the automatic pilot system having a manual pilot control input from, for example, the control column of the aircraft.

Figure 1:
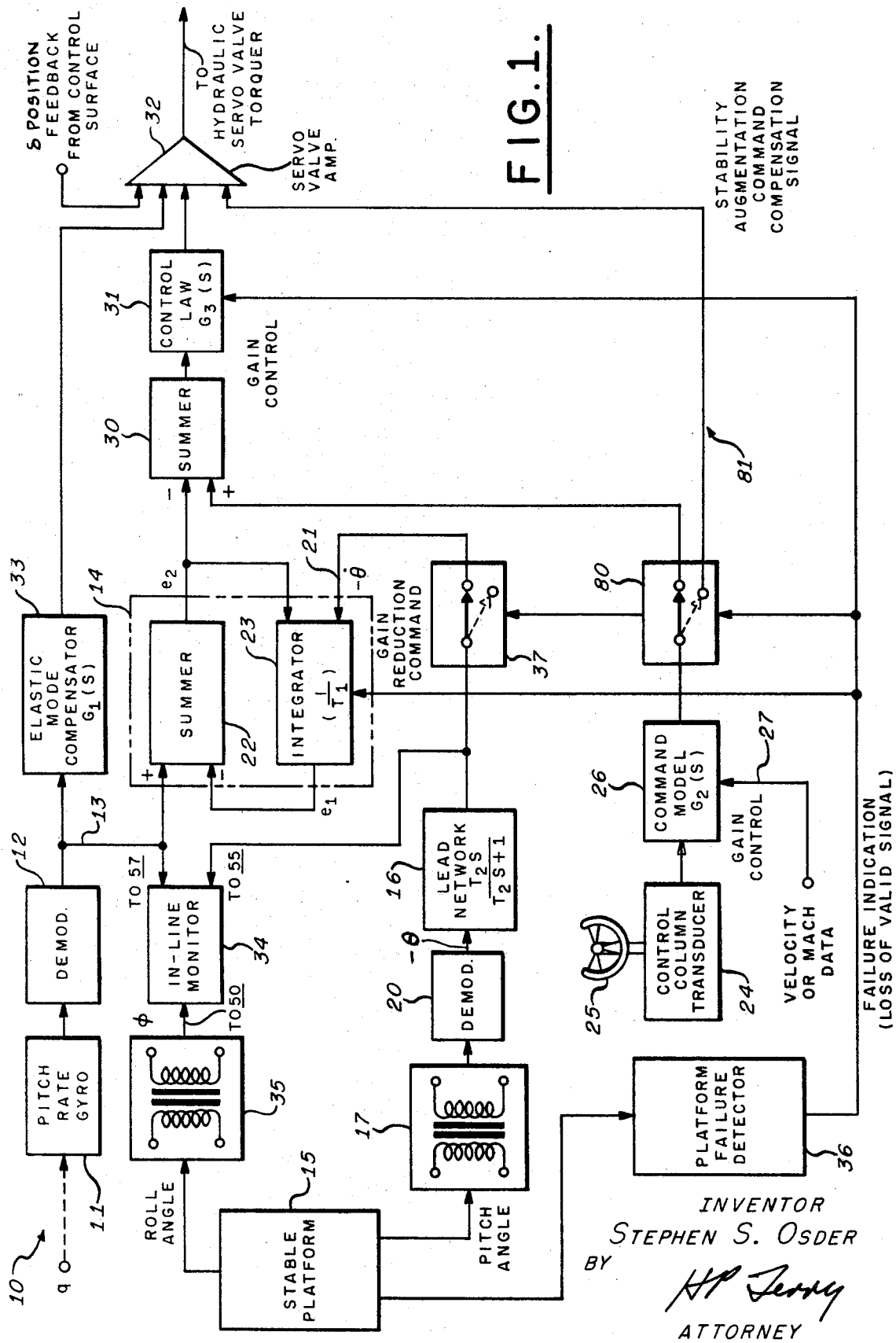
FIG. 1 is a block schematic diagram of a rate command augmentation automatic pilot incorporating the washout circuit of the present invention.

Referring now to FIG. 1, the pitch axis channel 10 of the command augmentation automatic pilot is illustrated including a pitch rate sensor 11 for providing the aerodynamic and elastic mode feedback signals for the system. The pitch sensor 11 is, for example, a pitch rate gyro mounted to the body of the craft at a station so as to properly sense the elastic mode and rigid body motions thereof to provide the required wide bandwidth aerodynamic and elastic mode feedback. The pitch rate gyro provides its signals through a demodulator 12 to a lead 13. The pitch rate gyro 11 provides first feedback signals comprised of components such as the craft response to a command input, craft motion due to displacements from the commanded flight path, aerodynamic oscillatory rigid body motions, elastic mode motions of the craft, and a normally steady state component due to azimuth rate coupling into the pitch axis when the craft executes banked turn maneuvers. All but the latter component are considered desirable and necessary stability components in controlling the flight path of the aircraft. The azimuth rate coupling term is considered an undesirable signal component. When, for example, the craft executes constant altitude, steady bank angle turns, and the pitch rate with respect to the earth is zero, the azimuth rate coupling term erroneously provides a signal component that appears to the automatic pilot as a nose-down command. The aircraft will consequently assume an undesirable diving attitude unless measures are taken to prevent it.

As is well known, the pitch rate feedback $q$ sensed by the pitch rate gyro 11 provides a signal on the lead 13 in accordance with $$q \approx \dot{\theta} \cos \phi + (g/V) \sin \phi \tan \phi$$

where:
$\dot{\theta}$ = the pitch rate of the craft with respect to the Earth,
$\phi$ = the roll angle of the craft,
$g$ = the Earth's gravitational constant, and
$V$ = the craft's forward velocity.

It is appreciated that the term $\dot{\theta} \cos \phi$ represents the desirable stabilizing components of the feedback signal while $g/V \sin \phi \tan \phi$ represents the undesirable azimuth rate coupling term. With the craft in wing's level flight, $q \approx \dot{\theta}$. With the craft in a constant altitude banked turn, disregarding the craft oscillatory and elastic mode motions, $q \approx g/V \sin \phi \tan \phi$. The signal on the lead 13 is applied to an augmented washout circuit 14 configured in accordance with the present invention in a manner to be later explained.

In accordance with the teachings of the invention, the automatic pilot 10 further includes second pitch rate sensor means referenced to the true vertical with respect to the Earth for providing a second pitch rate feedback signal. The second sensor means primarily comprises a stabilized platform 15 and a lead network 16. The lead network 16 is a rate taking circuit having the transfer function $$T_2 S/T_2 S + 1$$

where $T_2$ is the network time constant. The vertically referenced pitch angle output $\theta$ of the stabilized platform 15 is applied through a transformer 17 and a demodulator 20 to the lead network 16, the transformer 17 and the demodulator 20 being configured in a conventional manner to provide the quantity $-\theta$ to the lead network 16. The lead network 16 thus provides a rate signal $-\dot{\theta}$ on a lead 21 via a switch 37 to augment the washout circuit 14 in accordance with the teachings of the present invention, in a manner now to be explained.

The augmented washout circuit 14 comprises a summer 22 having two inputs and an output $e_2$ and an integrator 23 having two inputs and an output $e_1$. The first feedback signal $q$ on the lead 13 is applied to one of the inputs of the summer 22 and the output $e_2$ of the summer 22 is applied to one of the inputs of the integrator 23. The output $e_1$ of the integrator 23 is applied subtractively to the other input of the summer 22, while the second feedback signal $-\dot{\theta}$ on the lead 21 is applied subtractively to the other input of the integrator 23. The integrator 23 has a loop gain of $1/T_1$.

Network analysis of the washout circuit 14 indicates that the network output $e_2$ is expressed as $$e_2 = q (T_1 S/T_1 S+1) + \dot{\theta}/T_1 S+1$$

Thus the network 14 provides a washout on the signal $q$ from the pitch rate gyro 11 augmented by the signal $-\dot{\theta}$ from the vertically referenced platform 17. It should be noted that the input on the lead 21 to the integrator 23 prevents the network 14 from washing out steady state and low frequency components that are common to the signals on the leads 13 and 21 while permitting the washout of steady state and low frequency components contained in the signal on the lead 13 that are not included in the signal on the lead 21.

It is now appreciated that since for wing's level flight, $q \approx \dot{\theta}$, $$e_2 = \dot{\theta} (T_1 S+1)/(T_1 S+1) = \dot{\theta} \text{ and } e_1 \approx 0.$$

Thus, in effect, the vertically referenced pitch rate $\dot{\theta}$ balances the desirable components of the body axis pitch rate thereby providing augmentation thereof, preventing their being washed out. However, in banked turn maneuvers, the body axis pitch rate is not normally equal to the vertically referenced pitch rate. Typically, for constant altitude banked turns since $q \approx g/V \sin \phi \tan \phi$ and $\dot{\theta} \approx 0$, $$e_2 = (g/V) \sin \phi \tan \phi (T_1 S/T_1 S+1)$$

and the circuit 14 washes out the undesirable azimuth rate coupling term $g/V \sin \phi \tan \phi$ so that a nose-down attitude is not commanded thereby. The undesirable washed out component appears at the output $e_1$ of the integrator 23 and the output $e_2$ of the washout circuit 14 provides a wide bandwidth measurement of the pitch rate of the craft. It is appreciated that since the azimuth rate coupling term $g/V \sin \phi \tan \phi$ does not appear in the platform stabilized signal on the lead 21, the network 14 washes out this component from the signal on the lead 13 as previously discussed. It is appreciated that a vertical gyro may be utilized instead of the stabilized platform 15 in instrumenting the present invention to the same effect.

The command augmentation system illustrated in FIG. 1 further includes an input for a manual rate command signal from the human pilot. The rate command may, for example, be provided by a conventional transducer 24 arranged to sense displacements of the aircraft control column 25 or alternatively, the force applied thereto. The rate command signal provided by the transducer 24 is applied to a conventional command model circuit 26 having the transfer function $G_2(S)$. The function of the command model in automatic pilot systems is well understood by those skilled in the art. Briefly, the command model 26 comprises a prefilter on the control column command from the transducer 24 that shapes the transducer signal to provide a desired craft response reference. The command model 26 is ordinarily utilized to provide a smooth craft response to an abrupt command signal such as a step input of a type often applied by the human pilot. This smoothing function is commonly provided by a second order lag circuit. Command models are often used in automatic pilots having a high forward gain for reasons well appreciated by those skilled in the art.

A gain control input 27 on the command model 26, which derives a signal from the velocity or mach data from the air data system of the craft, may be included. A signal proportional to $1/V$ may be utilized in a manner well understood in the art to vary the gain of the command model to provide a desired feel characteristic for the control column 25 throughout a wide range of aircraft speeds.

The signal $e_2$ from the washout circuit 14 and the rate command input from the transducer 24 are applied to a summer 30. The summer 30 subtracts the feedback signal $e_2$ from the command signal from the transducer 24 to provide the attitude rate control loop error signal of the automatic pilot which in turn is applied to control law circuits 31. The control law circuits 31 have a transfer function $G_3(S)$ which may comprise any appropriate automatic pilot control law. For example, the control law may consist of the conventional proportional plus integral expression $(a_1 + a_2/S)$ where $a_1$ and $a_2$ are constants chosen in accordance with the dynamics of the craft in which the automatic pilot is utilized. It is appreciated that in the command augmentation automatic pilots of the type illustrated in FIG. 1, the gain through the control law circuits 31 is ordinarily chosen to be high for optimum performance.

The control law circuits 31 provide the elevator command signal to a servo amplifier 32 which in turn provides the displacement error signal for the elevator servo. The servo amplifier 32 forms a part of a conventional elevator positioning servo loop, the remainder of which is not shown for brevity. The elevator servo may be of any commonly used type such as an electromechanical servo or, as indicated by the legend, an electrohydraulic servo.

As previously discussed, the pitch rate gyro 11 is mounted at a body station along the fuselage of the craft so as to provide proper elastic mode stabilizing feedback signals. These signals are shaped in an elastic mode compensator 33 which has a transfer function designated as $G_1(S)$. The shaped and filtered elastic mode stabilizing signals are applied as an input to the servo amplifier 32 as a surface command in a manner and for reasons well understood in the automatic pilot art. The elastic mode compensator 33 is concerned only with high frequency aircraft dynamics and operates in parallel with the rigid body stabilization and command loop. The elastic mode compensator circuits 33 are of conventional design and may typically be instrumented to have a transfer function of the form $G_1(S) = (t_1S/t_1S+1) [(t_2S+1)/(t_3S+1)] [([S^2/w^2] + 1)/(S^2/w^2 + 2\zeta S/w + 1)] (K/t_4S + 1)$ The first term in the expression represents a high pass filtering function to remote steady state and low frequency components from the feedback signal. The second term represents a lead-lag compensator of a type well known in the art. The third term in the expression represents a notch filter for removing an undesirable frequency component from the stabilizing signal. Th last term in the expression represents a high frequency roll-off filter with a gain of $K$.

As previously mentioned, the pitch rate gyro 11 is mounted to properly sense the elastic mode motions of the aircraft. The stabilized platform 15, however, cannot usually be mounted at a body station to properly sense elastic mode motions. In fact, the mounting is usually such that the stabilized platform 15 senses undesirable bending motions. Since these undesirable bending motions are usually of high frequency content, the integrator 23 functions as a low pass filter that removes these undesirable high frequency components from the signal on the lead 21. In addition, this filtering action removes noise components commonly generated in lead networks such as the network 16. It may thus be appreciated that since the pitch rate gyro 11 provides proper high frequency stabilizing signals and the stabilized platform 15 provides proper low frequency and steady state stabilizing signals, the augmented washout circuit 14 functions as a complementary filter providing the proper high and low frequency components from the respective sensors.

The automatic pilot 10 additionally includes a monitor 34 for monitoring the operation of the sensors 11 and 15. The monitor 34 is responsive to the pitch rate gyro signal $q$ on the lead 13, the $\dot\theta$ signal on the lead 21, a roll angle signal $\phi$ provided by the platform 15 through a transformer 35 and a signal representative of the velocity or mach data from the air data system of the craft.

Figure 2:
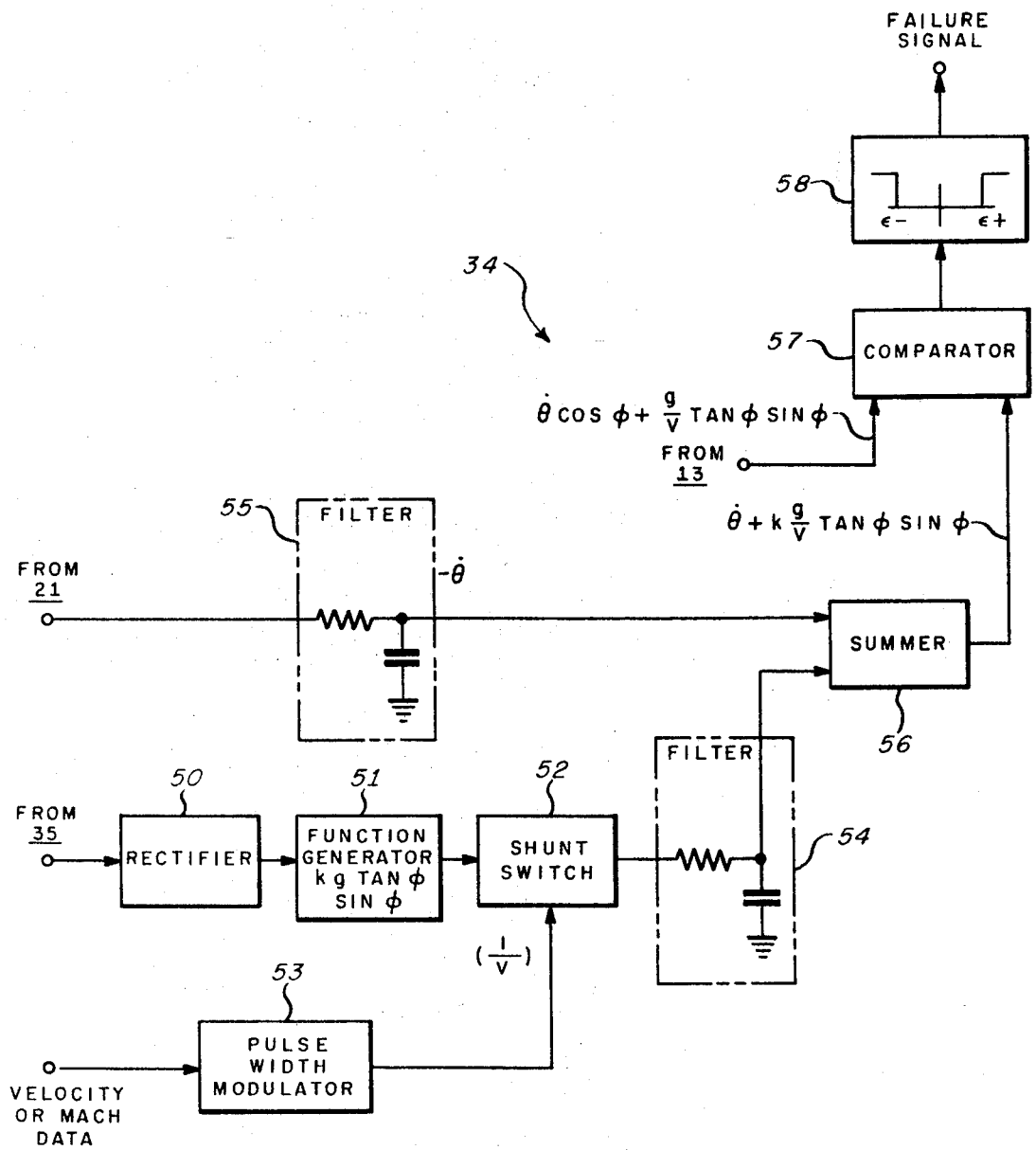
FIG. 2 is a block schematic diagram of a monitor circuit useful in detecting failures of the sensors of the automatic pilot of FIG. 1.

An understanding of the monitor 34 may be had by reference to FIG. 2 where the roll angle signal from the platform 15 and transformer 35 are applied as an input to a rectifier 50. The rectifier provides a signal representative of the absolute magnitude of the roll angle. The magnitude of the roll angle is applied to a function generator 51 configured to provide the function $kg \tan \phi \sin \phi$ where $k$ is a constant selected in a manner to be explained. The function generator 51 may comprise any convenient analog circuit such as a diode function generator. The output of the function generator 51 is applied to a shunt switch 52.

The velocity or mach data input to the monitor 34 is applied as an input to a pulse width modulator 53 which provides pulses of width proportional to the velocity input signal. The output of the pulse width modulator 53 is applied as an input to the shunt switch 52. The shunt switch 52 and the pulse width modulator 53 comprise a conventional two quadrant multiplier circuit for providing the product of the function $kg \tan \phi \sin \phi$ and the term $1/V$. Briefly, the pulses from the pulse width modulator 53 operate with the shunt switch 52 to transmit the signals from the function generator 51 for durations inversely proportional to the velocity input. The output of the shunt switch 52 is shaped through a filter 54 utilized to smooth the chopped d.c. signal applied thereto. Thus it is appreciated that the rectifier 50, the function generator 51, the shunt switch 52, the pulse width modulator 53, and the filter 54, comprise function generator means responsive to the roll and velocity signals for simulating a signal equivalent to the undesirable azimuth coupling component of the output of a properly operating body axis pitch rate gyro 11.

The signal $-\dot\theta$ applied to the monitor 34 from the lead 21 is connected as an input to a filter 55 having similar dynamic characteristics as the filter 54. The signals from the filters 54 and 55 are applied to a summer 56 which provides a signal represented by the expression $\dot\theta + (kg/V) \tan \phi \sin \phi$ .

Thus it is appreciated that the rectifier 50, the function generator 51, the shunt switch 52, the pulse width modulator 53, the filters 54 and 55 and the summer 56 form a network for simulating the output of a properly operating body axis pitch rate gyro 11.

The signal from the summer 56 is applied as an input to a comparator 57. The other input to the comparator 57 is derived from the pitch rate gyro 11 via the lead 13. As previously explained, the signal on the lead 13 is of the form $\dot\theta \cos \phi + (g/V) \tan \phi \sin \phi$.

It is appreciated that the respective expressions for the two input signals applied to the comparator 57 differ in the term $k$ in the one expression and in the term $\cos \phi$ in the other expression. For the range of bank angles normally encountered in jet transports, the constant $k$ may be chosen so that normally the two signals into the comparator will be equal at the center of this range of bank angles. Thus, the comparator 57, which provides the difference between the signals applied thereto, generates positive and negative error signals with magnitudes below a predetermined value for properly operating sensors.

The output of the comparator 57 is applied to a threshold detector 58 which in turn provides a failure signal whenever the absolute magnitude of the output of the comparator 57 exceeds the predetermined value. The failure signal is representative of malfunction of either the pitch rate gyro 11, the platform 15, or the circuits associated therewith.

Referring again to FIG. 1, a failure detector 36, which may be of any conventional configuration, is usually included within the stabilized platform 15 to specifically detect failures thereof. Should the platform 15 fail to provide valid data to the automatic pilot system of FIG. 1, the failure detector 36 will provide an indication thereof. The failure indication is utilized to alter the configuration of the command augmentation system of FIG. 1 to provide a simpler stability augmentation loop including a control stick steering facility having a degraded performance capability as compared to the properly operating system. This is achieved by utilizing the failure signal from the detector 36 to disconnect the derived rate signal to the integrator on lead 21 by means of the switch 37. The failure signal from the failure detector 36 is also utilized to reduce the gain of the integrator 23 thereby increasing the effective washout time constant which results in a washout that is less effective in attenuating the desirable low frequency stabilizing signals compared to the performance of the circuit 14 in the absence of a signal from the detector 36. Hence, in its failed configuration, the washout circuit 14 provides adequate stability but is not as effective in washing out the undesirable azimuth rate coupling term.

The failure signal from the platform failure detector 36 causes the pitch rate command system to revert to a stability augmentation system. The steady state pitch rate signal that is free of azimuth rate coupling is removed via switch 37. The command signal is removed via switch 80. The control law $G_\theta(s)$ is changed to remove the integration terms via the gain control signal from the platform failure indication. The control wheel signal may be reinserted via switch 80 and lead 81. This reinsertion of the control wheel signal at the servo amplifier input results in a compensated stability augmentation configuration as opposed to the attitude rate command configuration that existed previously. A compensated stability augmentation system of this type does not result in precise attitude rate commands proportional to control wheel outputs as in the case of the rate command augmentation system, but rather a means of restoring the responsiveness of the aircraft to pilot commands. The stability augmentation system damps the vehicle motions to gust disturbances and would attenuate the manual response if this compensation loop via lead 81 were not used.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In an automatic pilot for navigable craft including body mounted first sensor means for providing a first feedback signal having desirable and undesirable low frequency and steady state components representing motion of said craft about an axis thereof, comprising
   second sensor means for providing a second feedback signal having said desirable components representing said motion of said craft about said axis, and
   washout circuit means responsive to said first and second feedback signals for attenuating said low frequency and steady state components of said first feedback signal that are not included in said second feedback signal.

2. In the apparatus of claim 1 in which said washout circuit means comprises
   algebraic summation means, and
   integrator means,
   the output of said summation means being coupled to an input of said integrator means and the output of said integrator means being connected to an input of said summation means,
   said summation means being responsive to said first feedback signal and said integrator means being coupled to receive said second feedback signal for attenuating said components of said first feedback signal that are not included in said second feedback signal.

3. In the apparatus of claim 1 in which
   said axis comprises the pitch axis of said craft,
   said desirable signal components comprise pitch axis stabilizing signals, and
   said undesirable signal components comprise signals resulting from said craft executing banked turn maneuvers.

4. In the apparatus of claim 1 in which said second sensor means comprises vertically referenced sensor means.

5. In the apparatus of claim 4 in which
   said first sensor means comprises rate sensor means for providing said first feedback signal representing the rate of said craft about said axis in craft coordinates, and
   said second sensor means further includes rate network means coupled to said vertically referenced sensor means for providing said second feedback signal representing the rate of said craft about said axis in stabilized coordinates.

6. In an automatic pilot for navigable craft including body mounted first rate sensor means for providing a first feedback signal representing rates of said craft about the pitch axis thereof, said first feedback signal comprising low frequency and steady state pitch axis stabilizing signal components and undesirable signal components resulting from said craft executing banked turn maneuvers, comprising
   second rate sensor means for providing a second feedback signal having said stabilizing signal components representing said rates of said craft about said pitch axis, and
   washout circuit means responsive to said first and second feedback signals for attenuating said components of said first feedback signals that are not included in said second feedback signals.

7. In the apparatus of claim 6 in which said washout circuit means comprises
first algebraic summation means having first and second inputs and an output,
said first feedback signal being applied to said first input of said first summation means, and
integrator means having first and second inputs and an output,
said output of said summation means being applied to said first input of said integrator means,
said second feedback signal being applied to second input of said integrator means in subtractive relation to said first input thereof,
said output of said integrator means being applied to said second input of said first summation means in subtractive relation to said first input thereof,
thereby attenuating said components of said first feedback signal that are not included in said second feedback signal.

8. In the apparatus of claim 7 in which
said first rate sensor means comprises pitch rate gyro means for providing said first feedback signal representing the rate of said craft about said pitch axis in craft coordinates, and
said second rate sensor means comprises stabilized platform means and rate network means coupled to said stabilized platform means for providing said second feedback signal representing the rate of said craft about said pitch axis in stabilized coordinates.

9. In the apparaus of claim 8
in which said pitch rate gyro means is mounted to the body of said craft to provide further stabilizing signal components of said first feedback signal representative of elastic mode motions of said craft about said pitch axis, and
further including elastic mode circuit means responsive to said first feedback signal for providing said elastic mode stabilizing signal components.

10. In the apparatus of claim 8 in which said automatic pilot further includes
a source of command signal,
second algebraic summation means responsive to said command signal and said output of said first algebraic summation means for providing the error signal of said automatic pilot,
control law means responsive to said error signal, and
servo means coupled to said control law means to position the elevator of said craft in response to said error signal.

11. In the apparatus of claim 10 further including failure detector means coupled to said stabilized platform means for providing a signal representative of failure of said platform, first switching means for disconnecting said command signal from said second algebraic summation means and for connecting said command signal to said servo means in response to said failure signal, and second switching means for disconnecting said second feedback signal from said integrator means in respone to said failure signal,
said integrator means including means for reducing the gain thereof in response to said failure signal, and
said control law means including means for reducing the gain thereof in response to said failure signal.

12. In the apparatus of claim 6 in which said second rate sensor means comprises
vertically referenced sensor means for providing pitch and roll signals representative of the pitch and roll angles of said craft, respectively, in stabilized coordinates, and
rate network means responsive to said pitch signal for providing said second feedback signal representing the rate of said craft about said pitch axis in stabilized coordinates.

13. In the apparatus of claim 12 further including monitor means comprising
simulating means responsive to said second feedback signal and said roll signal for generating a simulating signal normally equivalent to said first feedback signal, and
comparison means responsive to said simulating signal and said first feedback signal for providing a failure signal when the difference therebetween exceeds a predetermined value.

14. In the apparatus of claim 13 in which said craft includes a source of signals representative of the velocity thereof and in which said simulating means comprises
function generator means responsive to said roll and velocity signals for generating a function signal normally equivalent to said undesirable signal components, and
summation means responsive to said function signal and said second feedback signal for providing the sum thereof thereby generating said simulating signal.

* * * * *